United States Patent
Imai et al.

(10) Patent No.: US 12,084,832 B2
(45) Date of Patent: Sep. 10, 2024

(54) WORK VEHICLE

(71) Applicant: Komatsu Ltd., Tokyo (JP)

(72) Inventors: Yosuke Imai, Tokyo (JP); Makoto Nomura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 565 days.

(21) Appl. No.: 17/418,438

(22) PCT Filed: Feb. 25, 2020

(86) PCT No.: PCT/JP2020/007524
§ 371 (c)(1),
(2) Date: Jun. 25, 2021

(87) PCT Pub. No.: WO2020/175489
PCT Pub. Date: Sep. 3, 2020

(65) Prior Publication Data
US 2022/0090356 A1   Mar. 24, 2022

(30) Foreign Application Priority Data

Feb. 28, 2019  (JP) ................. 2019-036972

(51) Int. Cl.
| | |
|---|---|
| *E02F 9/16* | (2006.01) |
| *E02F 9/08* | (2006.01) |
| *E02F 9/12* | (2006.01) |
| *E02F 9/20* | (2006.01) |

(52) U.S. Cl.
CPC ............ *E02F 9/166* (2013.01); *E02F 9/0858* (2013.01); *E02F 9/123* (2013.01); *E02F 9/2075* (2013.01)

(58) Field of Classification Search
None
See application file for complete search history.

(56) References Cited

U.S. PATENT DOCUMENTS

| | | | | |
|---|---|---|---|---|
| 2009/0261761 A1* | 10/2009 | Yoshioka | ................ | H02P 27/06 318/400.22 |
| 2013/0253781 A1 | 9/2013 | Li | | |
| 2013/0318956 A1* | 12/2013 | Yunoue | ................. | E02F 9/2285 60/431 |
| 2014/0117934 A1* | 5/2014 | Kurikuma | ......... | H02J 7/007182 320/109 |

(Continued)

FOREIGN PATENT DOCUMENTS

| | | |
|---|---|---|
| CN | 103261532 A | 8/2013 |
| CN | 103299005 A | 9/2013 |

(Continued)

OTHER PUBLICATIONS

Office Action mailed Apr. 7, 2022, issued for Chinese Patent Application No. 202080007716.8.

(Continued)

*Primary Examiner* — Jared Fureman
*Assistant Examiner* — Joel Barnett
(74) *Attorney, Agent, or Firm* — Locke Lord LLP (57) ABSTRACT

A work vehicle includes a start-up switch, a first electric device, and a second electric device. Electric power is supplied to the first electric device based on an operating state of the start-up switch and an electric power supply command. Electric power is supplied to the second electric device based on the operating state of the start-up switch.

6 Claims, 6 Drawing Sheets

(56) References Cited

U.S. PATENT DOCUMENTS

| | | | |
|---|---|---|---|
| 2015/0202979 A1* | 7/2015 | Murakami | B60L 15/20 |
| | | | 903/903 |
| 2017/0058489 A1 | 3/2017 | Nomura et al. | |
| 2018/0258613 A1 | 9/2018 | Amano et al. | |

FOREIGN PATENT DOCUMENTS

| | | |
|---|---|---|
| CN | 106164384 A | 11/2016 |
| JP | 2007-288894 A | 11/2007 |
| JP | 2010-22164 A | 1/2010 |
| JP | 2013-129976 A | 7/2013 |
| JP | 2013-198179 A | 9/2013 |
| JP | 2016-196759 A | 11/2016 |
| JP | 2017-115454 A | 6/2017 |
| JP | 2018-84099 A | 5/2018 |
| KR | 10-2014-0009279 A | 1/2014 |
| WO | 2012/114794 A1 | 8/2012 |

OTHER PUBLICATIONS

Office Action dated Nov. 25, 2022, issued in the corresponding KR patent application No. 10-2021-7021557 and English translation thereof.

* cited by examiner

|  | FIRST ELECTRIC DEVICE | SECOND ELECTRIC DEVICE |
|---|---|---|
| KEY-ON STATE AND ELECTRIC POWER SUPPLY COMMAND OUTPUT STATE (THIRD SWITCH ELEMENT 93 IS TURNED ON) | ENERGIZED (FIRST SWITCH ELEMENT IS TURNED ON) | ENERGIZED (SECOND SWITCH ELEMENT IS TURNED ON) |
| KEY-OFF STATE AND ELECTRIC POWER SUPPLY COMMAND OUTPUT STATE (THIRD SWITCH ELEMENT 93 IS TURNED ON) | ENERGIZED (FIRST SWITCH ELEMENT IS TURNED ON) | DE-ENERGIZED (SECOND SWITCH ELEMENT IS TURNED OFF) |
| KEY-ON STATE AND ELECTRIC POWER SUPPLY COMMAND NON-OUTPUT STATE (THIRD SWITCH ELEMENT 93 IS TURNED OFF) | ENERGIZED (FIRST SWITCH ELEMENT IS TURNED ON) | ENERGIZED (SECOND SWITCH ELEMENT IS TURNED ON) |
| KEY-OFF STATE AND ELECTRIC POWER SUPPLY COMMAND NON-OUTPUT STATE (THIRD SWITCH ELEMENT 93 IS TURNED OFF) | DE-ENERGIZED (FIRST SWITCH ELEMENT IS TURNED OFF) | DE-ENERGIZED (SECOND SWITCH ELEMENT IS TURNED OFF) |

FIG.6

WORK VEHICLE

FIELD

The present invention relates to a work vehicle.

BACKGROUND

As disclosed in Patent Literature 1, there is known an excavator in which an electric device is switched between an energized state and a de-energized state by operating a start-up switch.

CITATION LIST

Patent Literature

Patent Literature 1: JP 2016-196759 A

SUMMARY

Technical Problem

When performing operation work, turning the start-up switch to a key-on state energizes the electric device, while turning the start-up switch to a key-off state de-energizes the electric device. When charging work of the battery is performed, the electric device is energized in any of the key-on state and the key-off state. There is no need to have an operator close to the excavator in the key-off state, and it is possible to perform the battery charging work at an unmanned work site. When the electric device is energized when the battery charging work is performed at an unmanned work site, there is a possibility that the electric device might be operated by an outsider. For example, a mischievous outsider might operate the electric device unnecessarily. This leads to a demand for a technique capable of performing a battery charging work while suppressing the operation of the electric device by an outsider.

The present invention aims to perform the battery charging work while suppressing operations of the electric device by an outsider.

Solution to Problem

According to an aspect of the present invention, a work vehicle comprises: a start-up switch; a first electric device; and a second electric device, wherein electric power is supplied to the first electric device based on an operating state of the start-up switch and an electric power supply command, and electric power is supplied to the second electric device based on the operating state of the start-up switch.

Advantageous Effects of Invention

According to the present invention, it is possible to perform the battery charging work while suppressing operations of the electric device by an outsider.

DESCRIPTION OF EMBODIMENTS

Hereinafter, embodiments according to the present invention will be described, but the present invention is not limited to the embodiments. The constituents described in the individual embodiments below can be appropriately combined with each other. In some cases, a portion of the constituents is not utilized.

<Overview of Work Vehicle>

Figure 1:
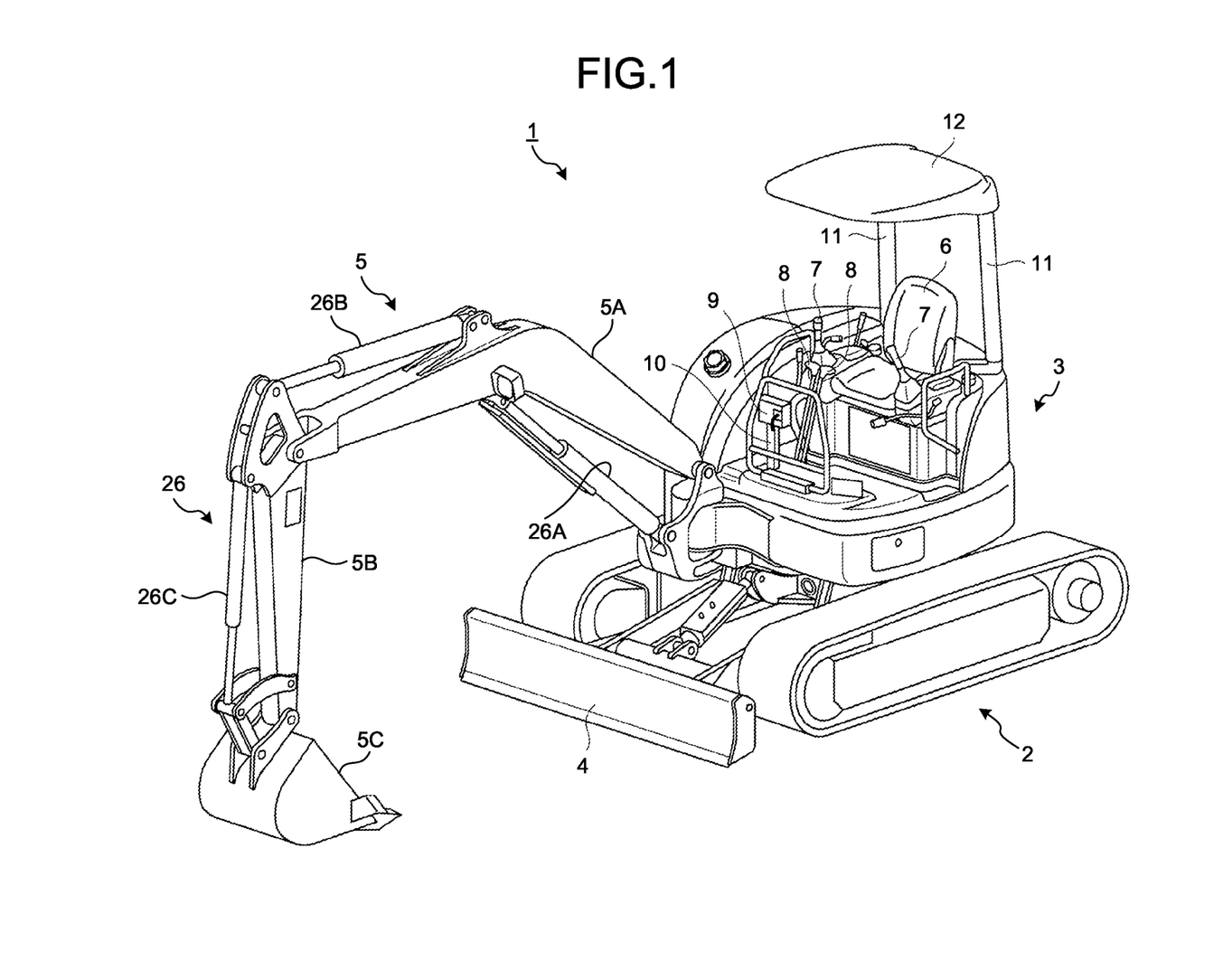
FIG. 1 is a perspective view illustrating a work vehicle according to the present embodiment.

FIG. 1 is a perspective view illustrating a work vehicle 1 according to the present embodiment. In the present embodiment, the work vehicle 1 is a compact excavator. In the following description, the work vehicle 1 will be appropriately referred to as an excavator 1.

The excavator 1 includes a carriage 2, a swivel member 3, a blade 4, and working equipment 5. The carriage 2 has a pair of tracks. The swivel member 3 swivels above the carriage 2. The blade 4 moves in the vertical direction in front of the carriage 2. The working equipment 5 is linked to the front part of the swivel member 3. The working equipment 5 has a boom 5A, an arm 5B, and a bucket 5C. The working equipment 5 is driven by the power generated by a working equipment cylinder 26. The working equipment cylinder 26 includes a boom cylinder 26A that drives the boom 5A, an arm cylinder 26B that drives the arm 5B, and a bucket cylinder 26C that drives the bucket 5C. Note that the excavator 1 need not include a blade.

The swivel member 3 includes an operator's seat 6, a working equipment lever 7, a traveling lever 8, a display device 9, a support column 11, and a canopy 12.

The operator's seat 6 is seated by the operator. The working equipment lever 7 is arranged both rightward and leftward of the operator's seat 6. The traveling lever 8 and the display device 9 are arranged in front of the operator's seat 6. The display device 9 is supported by a support arm 10. The support arm 10 is fixed to the front part of the floor of the swivel member 3. The operator can operate the working equipment lever 7 and the traveling lever 8 while sitting in the operator's seat 6. The operator can check the display device 9 while sitting in the operator's seat 6.

The support column 11 is fixed to the rear part of the swivel member 3. The canopy 12 is supported by the support column 11. The canopy 12 is located above the operator's seat 6. In the present embodiment, the excavator 1 is a canopy model in which the space around the operator's seat 6 is open.

Figure 2:
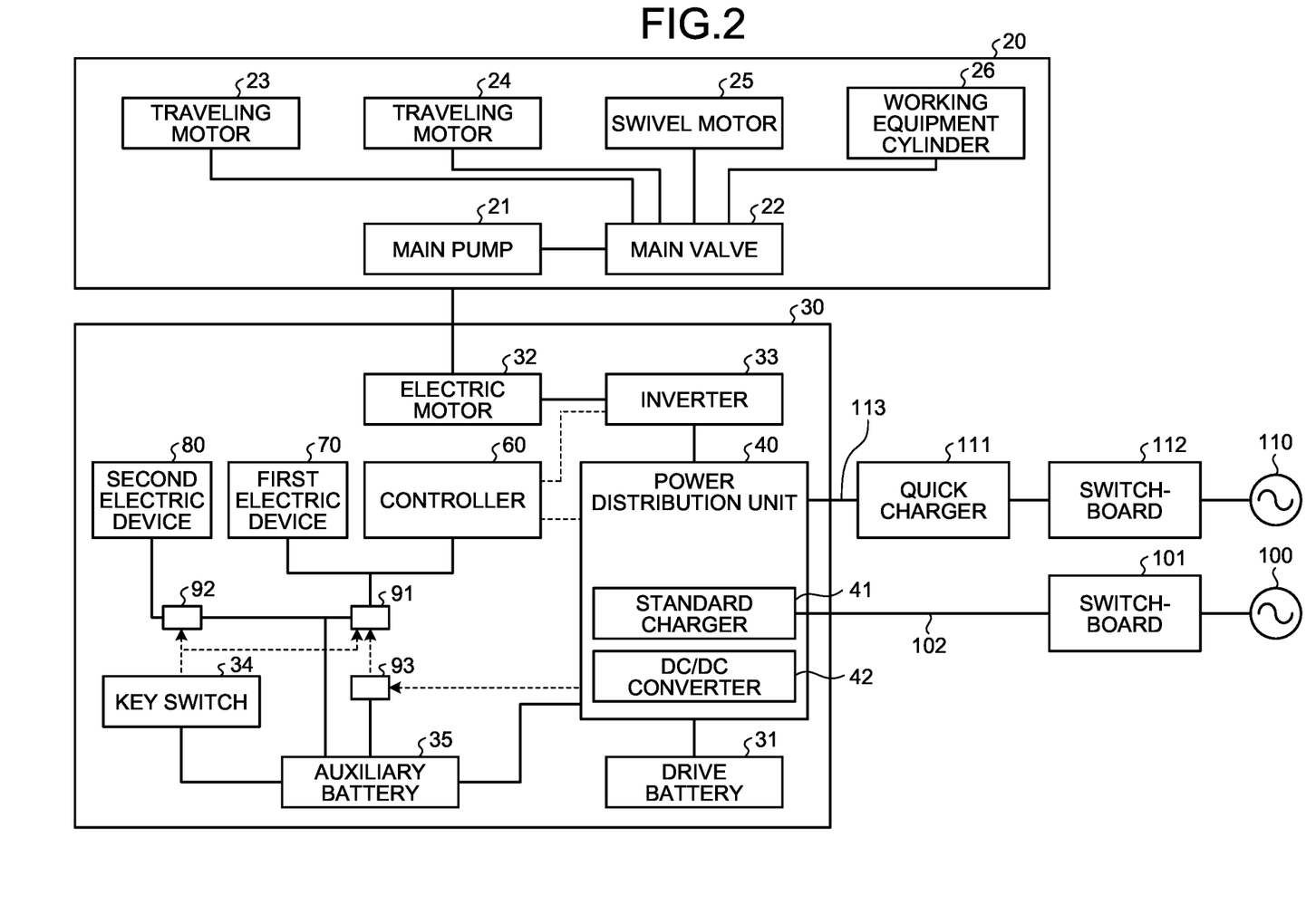
FIG. 2 is a block diagram illustrating the work vehicle according to the present embodiment.

FIG. 2 is a block diagram illustrating the excavator 1 according to the present embodiment. In the present embodiment, the excavator 1 includes a hydraulic system 20 and an electric system 30.

<Hydraulic System>

The hydraulic system 20 drives the carriage 2, the swivel member 3, and the working equipment 5, individually. The hydraulic system 20 includes a main pump 21, a main valve 22 connected to the main pump 21 via a flow path, a traveling motor 23 and a traveling motor 24 driven based on hydraulic oil supplied from the main pump 21, a swivel motor 25 that is driven based on the hydraulic oil supplied from the main pump 21, and the working equipment cylinder 26 that is driven based on the hydraulic oil supplied from the main pump 21.

The main pump 21 is a hydraulic pump that discharges hydraulic oil. The main pump 21 is a power source for each of the devices, namely, the traveling motor 23, the traveling motor 24, the swivel motor 25, and the working equipment cylinder 26.

Each of the traveling motor 23 and the traveling motor 24 is a hydraulic motor for causing the excavator 1 to travel. The traveling motor 23 drives one track of the carriage 2. The traveling motor 24 drives the other track of the carriage 2. The excavator 1 travels by the driving operation of the traveling motor 23 and the traveling motor 24.

The swivel motor 25 is a hydraulic motor for swiveling the swivel member 3. The swivel member 3 swivels by the driving operation of the swivel motor 25.

The working equipment cylinder 26 is a hydraulic cylinder for driving the working equipment 5. The working equipment cylinder 26 expands and contracts based on the flow rate of the hydraulic oil. The working equipment 5 is driven by the expansion and contraction of the working equipment cylinder 26.

<Electric System>

The electric system 30 includes a controller 60, a power distribution unit 40, a drive battery 31, an electric motor 32, an inverter 33, a key switch 34, an auxiliary battery 35, a first electric device 70, a second electric device 80, a first switch element 91, a second switch element 92, and a third switch element 93.

The drive battery 31 outputs electric power required to drive the excavator 1. The drive battery 31 is an electric power source for the excavator 1. The drive battery 31 supplies electric power to the electric motor 32. The excavator 1 is a battery-powered excavator that is driven based on the electric power supplied from the drive battery 31.

The electric motor 32 generates power to drive the main pump 21. The electric motor 32 is driven by the electric power supplied from the drive battery 31. The main pump 21 is connected to an output shaft of the electric motor 32 and is driven by the power generated by the electric motor 32.

The power distribution unit 40 distributes electric power of the drive battery 31 based on a command output from the controller 60. The power distribution unit 40 includes a standard charger 41 and a DC/DC converter 42. At the time of charging, the power distribution unit 40 supplies the charging electric power from the standard charger 41 or a quick charger 111 to the drive battery 31. When the drive battery 31 is discharged by the power distribution unit 40 during operation, electric power is supplied to the electric motor 32 via the inverter 33.

The inverter 33 supplies the electric power output from the power distribution unit 40 to the electric motor 32. The inverter 33 converts the DC voltage output from the power distribution unit 40 into an AC voltage and outputs this voltage to the electric motor 32. The electric motor 32 is driven by the electric power output from the inverter 33.

The drive battery 31 is a storage battery that is a rechargeable power storage device, for example, a battery. The drive battery 31 is charged by the standard charger 41 or the quick charger 111. The power distribution unit 40 including the standard charger 41 is provided on the swivel member 3. The standard charger 41 may be provided outside the excavator 1. The quick charger 111 is provided outside the excavator 1. The quick charger 111 may be provided inside the excavator 1.

The standard charger 41 performs standard charging on the drive battery 31. When a standard charging connector (not illustrated) of a standard charging cable 102 is connected to a standard charging inlet (not illustrated), the standard charger 41 will be connected to a switchboard 101 and a commercial power source 100. The switchboard 101 supplies single-phase 200 V AC power supplied from the commercial power source 100 to the standard charger 41 via the standard charging cable 102. The standard charger 41 converts single-phase 200 V AC power into DC power suitable for standard charging. The standard charger 41 charges the drive battery 31.

When the power distribution unit 40 has detected that a standard charging connector (not illustrated) of the standard charging cable 102 is connected to the standard charging inlet (not illustrated) and has detected that the standard charger 41 is connected to the switchboard 101 and the commercial power source 100, the power distribution unit 40 starts up the standard charger 41 to start standard charging of the drive battery 31. When the controller 60 has detected disconnection between the standard charging cable 102 and the standard charger 41, when the drive battery 31 is fully charged, or when an abnormality occurs during charging, the controller 60 stops the standard charging of the drive battery 31. The standard charging may be started by an operator's operation of a switch (not illustrated).

The quick charger 111 performs quick charging on the drive battery 31. The quick charger 111 has an operation switch that outputs an operation signal related to quick charging. The quick charging is started or stopped in response to an operation on the operation switch. The quick charger 111 is connected to a commercial power source 110 via a quick charging cable 113 and a switchboard 112. The excavator 1 is provided with a quick charging inlet to which the quick charging cable 113 is to be connected. The switchboard 112 supplies the three-phase 200 V AC power supplied from the commercial power source 110 to the quick charger 111 via the quick charging cable 113. The quick charger 111 converts three-phase 200 V AC power into DC power. The quick charger 111 charges the drive battery 31.

When the power distribution unit 40 has detected an operation signal indicating the start of quick charging from the quick charger 111 in a state where the quick charging cable 113 and the quick charging inlet (not illustrated) of the excavator 1 are connected to each other, the power distribution unit 40 starts quick charging of the drive battery 31. The quick charging by the quick charger 111 is performed according to a command from the controller 60. The controller 60 stops the quick charging of the drive battery 31 when the operation signal indicating the end of the quick charging is acquired from the quick charger 111, when a predetermined charging time is completed, or when an abnormality is detected during the charging.

The controller 60 controls the excavator 1. When driving the electric motor 32, the controller 60 outputs a torque command or a speed command for controlling the electric motor 32 to the inverter 33 based on a dial position on a motor rotation speed dial (not illustrated), a selection state on an operation mode setting device (not illustrated), an operating state of the working equipment lever 7 and an operating state of the traveling lever 8. When the electric motor 32 is driven, hydraulic oil is discharged from the main pump 21 so as to drive the carriage 2, the swivel member 3, and the working equipment 5.

The controller 60 outputs a command to the power distribution unit 40 so as to achieve, in standard charging, the power distribution suitable for standard charging and achieve, in quick charging, the power distribution suitable for quick charging, and achieve, in operating state, the power distribution suitable for the operation. When performing standard charging, the controller 60 outputs a command to the standard charger 41. When performing quick charging, the controller 60 outputs a command to the quick charger 111. When driving the electric motor 32, the controller 60 outputs a command to the inverter 33.

The key switch 34 is operated by an operator. The key switch 34 is a start-up switch for starting up the electric motor 32, and is a switch for supplying electric power to the first electric device 70 and the second electric device 80. When starting up the electric motor 32, the operator inserts a key into a key cylinder of the key switch 34 and rotates the key to a first position. When the key rotates to the first position, the electric motor 32 is started up. When the operator supplies electric power to the first electric device 70 and the second electric device 80 without starting up the electric motor 32, the operator inserts the key into the key cylinder of the key switch 34 and rotates the key to a second position just in front of the first position. When the key rotates to the second position, electric power is supplied to the first electric device 70 and the second electric device 80. Note that releasing the key after rotating the key to the second position will allow the key to stay in the second position, whereas releasing the key after rotating the key to the first position will allow the key to rotate to the second position and then to stay in the second position.

The auxiliary battery 35 supplies electric power to the first electric device 70 and the second electric device 80. The auxiliary battery 35 is a battery different from the drive battery 31. The auxiliary battery 35 is a 12 V or 24 V battery, which are lower voltages than the voltage used for the drive battery 31.

The first electric device 70 is driven by the electric power supplied from the auxiliary battery 35. The first electric device 70 is an electric device different from the electric motor 32. The first electric device 70 includes an electric device that is driven in the charging state of the drive battery 31. Examples of the first electric device 70 include a sensor to detect the temperature of the standard charger 41, a water pump for cooling the standard charger 41 with water, and a cooling fan for cooling the coolant for cooling the standard charger 41 with water.

The present embodiment has a conceptual assumption that the first electric device 70 includes the controller 60 and the display device 9. That is, the controller 60 and the display device 9 are each assumed to be one type of the first electric device 70.

The second electric device 80 is driven by the electric power supplied from the auxiliary battery 35. The second electric device 80 is an electric device different from the electric motor 32. The second electric device 80 includes an electric device disposed in the operator's seat 6, an electric device disposed around the operator's seat 6, or an electric device driven by an operation switch operable in the operator's seat 6. Examples of the second electric device 80 include a horn that emits a warning sound and a work light that illuminates the front of the excavator 1.

That is, the second electric device 80 is an electric device that can be easily operated by an operator or an outsider. The first electric device 70 is an electric device that cannot be easily operated by an operator or an outsider.

The first switch element 91 switches between supply/stop supply regarding the electric power to the first electric device 70. The first switch element 91 is arranged between the auxiliary battery 35 and the first electric device 70. When the first switch element 91 is turned on, electric power is supplied to the first electric device 70. When the first switch element 91 is turned off, electric power is not supplied to the first electric device 70.

The second switch element 92 switches between supply/stop supply regarding the electric power to the second electric device 80. The second switch element 92 is arranged between the auxiliary battery 35 and the second electric device 80. When the second switch element 92 is turned on, electric power is supplied to the second electric device 80. When the second switch element 92 is turned off, electric power is not supplied to the second electric device 80.

The third switch element 93 switches between supply/stop supply regarding the electric power to the first switch element 91. The third switch element 93 is arranged between the auxiliary battery 35 and the first switch element 91. When the third switch element 93 is turned on, electric power is supplied to the first switch element 91. When the third switch element 93 is turned off, electric power is not supplied to the first switch element 91. In the present embodiment, when electric power is supplied from the third switch element 93, the first switch element 91 turns on. When electric power is not supplied from the third switch element 93, the first switch element 91 turns off. That is, the first switch element 91 turns on when the third switch element 93 is in turned on. When the third switch element 93 is turned off, the first switch element 91 turns off.

The key switch 34 switches between supply/stop supply regarding the electric power to the first switch element 91 and the second switch element 92. The key switch 34 is arranged between the auxiliary battery 35 and the first switch element 91 and between the auxiliary battery 35 and the second switch element 92. When the key switch 34 is in turned on, electric power is supplied to the first switch element 91 and the second switch element 92. When the key switch 34 is turned off, electric power is not supplied to the first switch element 91 or the second switch element 92. In the present embodiment, when electric power is supplied from the key switch 34, the first switch element 91 and the second switch element 92 turn on. When electric power is not supplied from the key switch 34, the first switch element 91 and the second switch element 92 turn off. That is, the first switch element 91 and the second switch element 92 turn on when the key switch 34 is turned on. When the key switch 34 is turned off, the first switch element 91 and the second switch element 92 turn off.

Note that the operating state includes not only a state in which the working equipment 5 is actually operating or the electric motor 32 is driving, but also a state in which the electric motor 32 is stopped due to an idle reduction system or the like. The operating state may also include a state in which the key switch is turned on and the drive battery 31 is not actually charging. Furthermore, the operating state may also include the time after the key switch 34 is turned off and before the electric system 30 of the excavator 1 shuts down. That is, the operating state may include the entire time other than the operator's work of charging the drive battery 31 of the excavator 1. Note that there never exists a state including both the operating state and the charging state. Furthermore, the operating state does not include the state in which the electric system 30 of the excavator 1 is shut down.

Note that the charging state may include not only the state of actually charging the drive battery 31 but also the state in which the charging connector is connected to a charging inlet. Furthermore, the charging state may include a state from the time of extracting the charging connector from the charging inlet to the end the charging until the electric system 30 of the excavator 1 shuts down. That is, the charging state may include the entire state other than the state where the operator is working on the operating working equipment 5 or the like of the excavator 1. Furthermore, the charging state does not include the state in which the electric system 30 of the excavator 1 is shut down.

In the following description, the state in which electric power is supplied to the first electric device 70 is appropriately referred to as an energized state, while the state in which electric power is not supplied to the first electric device 70 is appropriately referred to as de-energized state. The state in which electric power is supplied to the second electric device 80 is appropriately referred to as an energized state, while the state in which electric power is not supplied to the second electric device 80 is appropriately referred to as de-energized state.

In the present embodiment, electric power is supplied to the first electric device 70 based on the operating state of the key switch 34 and an electric power supply command. Electric power is supplied to the second electric device 80 based on the operating state of the key switch 34.

The operating state of the key switch 34 includes a key-off state, a key-on state, and a start state. When rotated by the operator with the key inserted in the key cylinder, the key switch 34 rotates to one of the "off", "on", or "start" positions. When rotated to the "off" position, the key switch 34 is set to the key-off state. When rotated to the "on" position, the key switch 34 is set to the key-on state. When rotated to the "start" position, the key switch 34 is set to the start state.

When the key switch 34 is in the key-off state, no electric power is supplied either to the first electric device 70 or to the second electric device 80. When the key switch 34 is in the key-off state, the electric motor 32 is not driven.

When the key switch 34 is in the key-on state, electric power is supplied to the first electric device 70 and the second electric device 80 each. When the key switch 34 is in the key-on state, the electric motor 32 cannot start driving, but can continue the driving state.

When the key switch 34 is in the start state, electric power is supplied to the first electric device 70 and the second electric device 80 each. When the key switch 34 is not in the charging state in the start state, the electric motor 32 starts driving.

In the present embodiment, the electric power supply command is output from the power distribution unit 40 when the drive battery 31 is in a predetermined state. That the drive battery 31 is in a predetermined state includes that the drive battery 31 is in a charging state. When the drive battery 31 is in the charging state, the electric power supply command is output from the power distribution unit 40. When having determined that the drive battery 31 is in the charging state, the power distribution unit 40 outputs an electric power supply command. When having determined that the drive battery 31 is in an operating state, the power distribution unit 40 does not output the electric power supply command.

When having detected that the standard charging cable 102 and the standard charger 41 are connected to each other, the power distribution unit 40 can output an electric power supply command. When having detected an operation signal indicating the start of quick charging in a state where the quick charging cable 113 and the quick charging inlet of the excavator 1 are connected to each other, the power distribution unit 40 can output an electric power supply command.

When having detected that the connection between the standard charging cable 102 and the standard charger 41 has been released from each other, the power distribution unit 40 can stop the output of the electric power supply command. The power distribution unit 40 can stop the output of the electric power supply command when the operation signal indicating the end of the quick charging is acquired, when a predetermined charging time is completed, or when an abnormality is detected during the charging.

The first switch element 91 operates based on one or both of the operating state of the key switch 34 and the electric power supply command. The first switch element 91 turns off when the key switch 34 is in the key-off state. The first switch element 91 turns on when the key switch 34 is in the key-on state or a key-start state. The first switch element 91 turns on when the electric power supply command is in an output state even when the key switch 34 is in the key-off state. In the following description, the key-on state shall include the key-start state.

When the first switch element 91 is turned on, electric power is supplied to the first electric device 70. When the first switch element 91 is turned off, electric power is not supplied to the first electric device 70.

The second switch element 92 operates based on the operating state of the key switch 34. When the key switch 34 is in the key-off state, the second switch element 92 turns off. When the key switch 34 is in the key-on state, the second switch element 92 turns on.

When the second switch element 92 is turned on, electric power is supplied to the second electric device 80. When the second switch element 92 is turned off, electric power is not supplied to the second electric device 80.

The third switch element 93 operates based on the electric power supply command. When the electric power supply command is in the output state, the third switch element 93 turns on. When the electric power supply command is in a non-output state, the third switch element 93 turns off.

When the third switch element 93 is in turned on, the first switch element 91 turns on. When the third switch element 93 is turned off, the first switch element 91 turns off.

Figure 3:
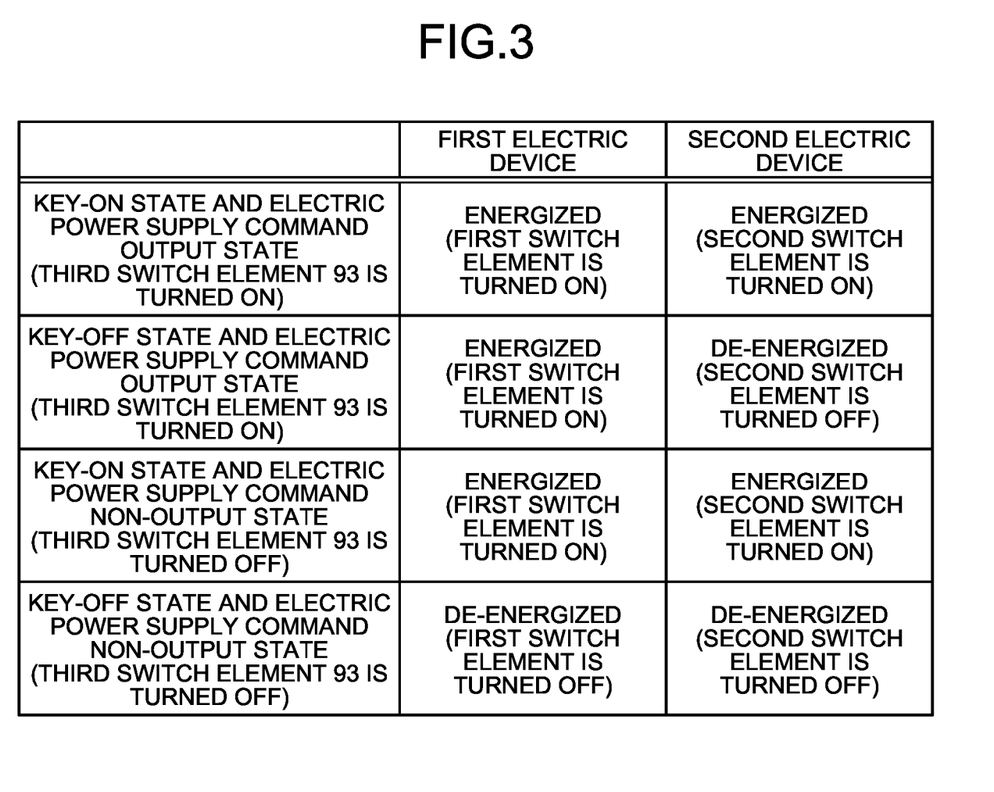
FIG. 3 is a diagram illustrating an electric power supply state according to the present embodiment.

FIG. 3 is a diagram illustrating an electric power supply state according to the present embodiment. As illustrated in FIG. 3, in the present embodiment, when the key switch 34 is in the key-off state and the electric power supply command is in the output state, electric power is supplied to the first electric device 70, while electric power is not supplied to the second electric device 80. That is, when the key switch 34 is in the key-off state and the drive battery 31 is in the charging state, the first switch element 91 turns on and the first electric device 70 is energized. When the key switch 34 is in the key-off state and the drive battery 31 is in the charging state, the second switch element 92 turns off and the second electric device 80 is de-energized.

When the key switch 34 transitions from the key-off state to the key-on state when the key switch 34 is in the key-off state and the electric power supply command is in the output state, electric power is supplied to the first electric device 70 and the second electric device 80 each. That is, when the key switch 34 transitions from the key-off state to the key-on state when the drive battery 31 is in the charging state, the second switch element 92 turns on, and the first electric device 70 and the second electric device 80 are each energized. Incidentally, the first electric device 70 is energized via the third switch element 93 only by the condition that the electric power supply command goes into the output state.

When the key switch 34 is in the key-on state, electric power is supplied to the first electric device 70 and the second electric device 80 each. That is, when the key switch 34 is turned on, the first switch element 91 turns on and the first electric device 70 is energized. When the key switch 34 is turned on, the second switch element 92 turns on and the second electric device 80 is energized.

When the key switch 34 is in the key-off state and the electric power supply command is in the non-output state, no electric power is supplied either to the first electric device 70 or to the second electric device 80. That is, when the key switch 34 is in the key-off state and the drive battery 31 is not in the charging state, that is, in a state of being neither in the operating state nor in the charging state, the first switch element 91 and the second switch element 92 each turn off, and the first electric device 70 and the second electric device 80 are each de-energized.

<Operation of Electric System>

Figure 4:
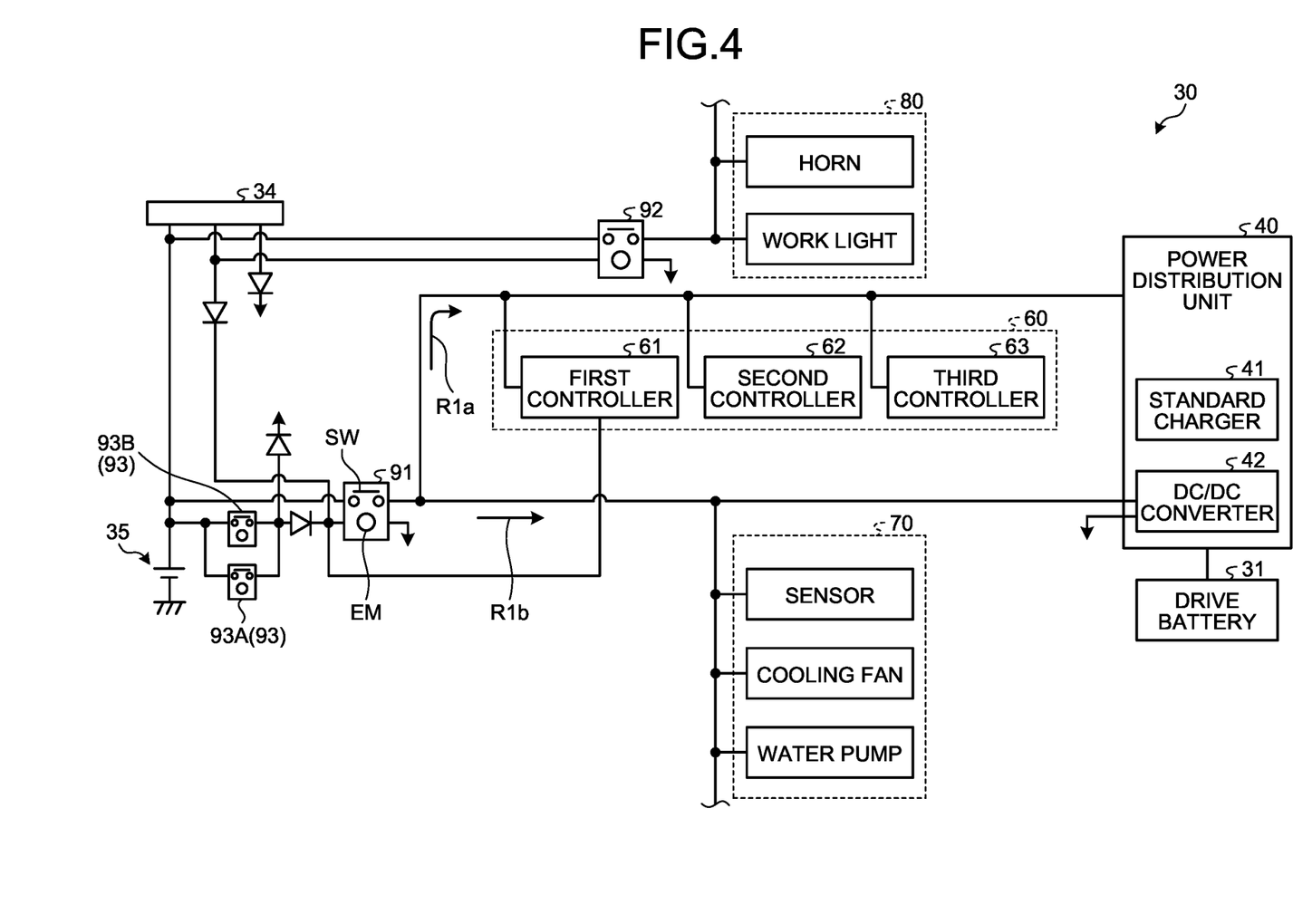
FIG. 4 is a diagram illustrating an example of an electric system according to the present embodiment.
Figure 5:
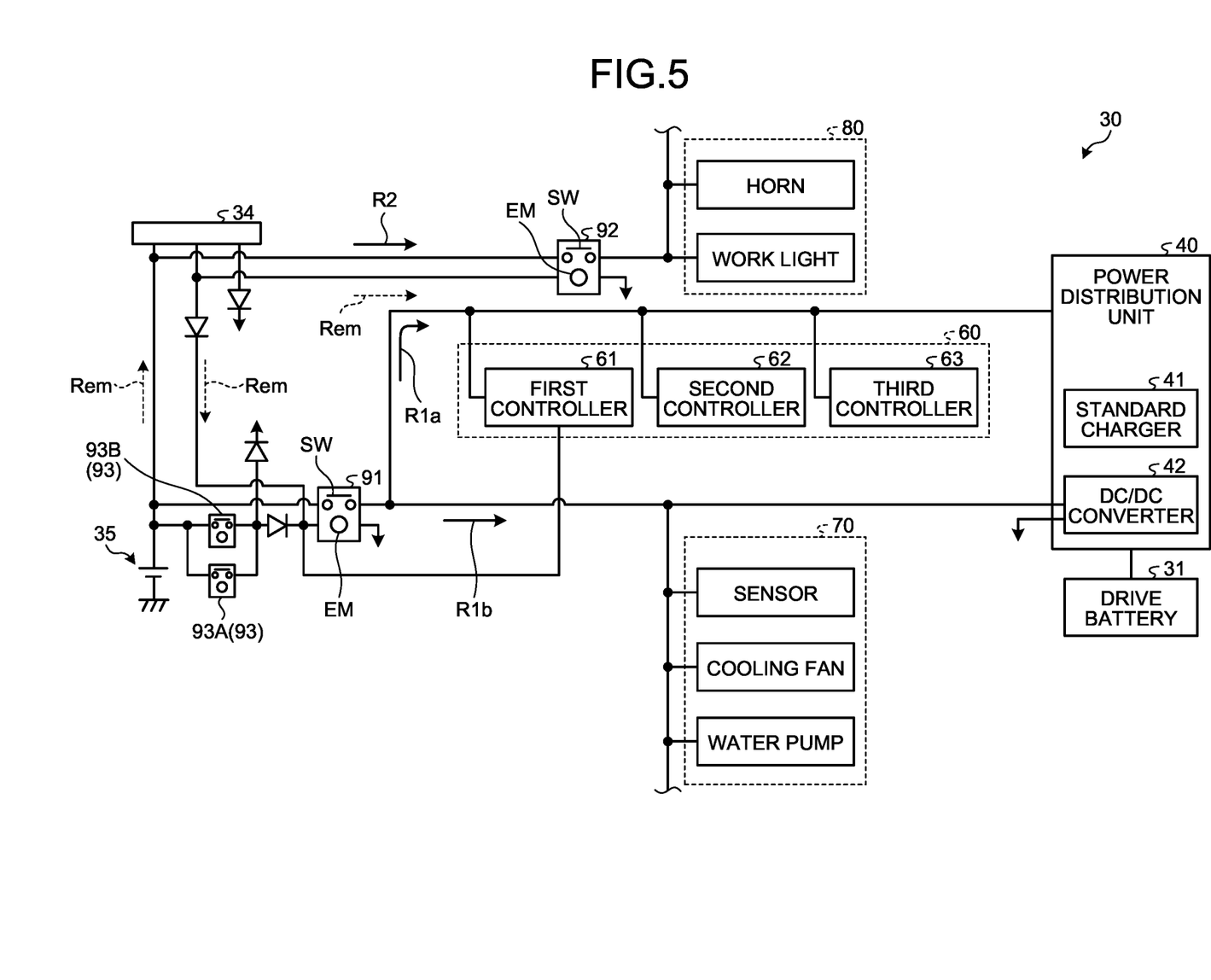
FIG. 5 is a diagram illustrating an example of the electric system according to the present embodiment.

FIG. 4 and FIG. 5 are diagrams each illustrating an example of the electric system 30 according to the present embodiment. FIG. 4 illustrates an example in which the key switch 34 is in the key-off state and the drive battery 31 is in the charging state. FIG. 5 illustrates an example in which the key switch 34 is in the key-on state. In the examples illustrated in FIGS. 4 and 5, each of the first switch element 91, the second switch element 92, and the third switch element 93 is a relay.

As illustrated in FIG. 4, even when the key switch 34 is in the key-off state, the third switch element 93 turns on and the first switch element 91 turns on when the charging of the drive battery 31 is started and the electric power supply command has been output from the power distribution unit 40. When the key switch 34 is in the key-off state, the second switch element 92 turns off.

As illustrated in FIG. 4, in the present embodiment, the third switch element 93 includes: a third switch element 93A that turns on when the drive battery 31 performs standard charging; and a third switch element 93B that turns on when the drive battery 31 performs quick charging.

When the standard charging of the drive battery 31 is started when the key switch 34 is in the key-off state, the third switch element 93A turns on. When the third switch element 93A has turned on, the electric power output from the auxiliary battery 35 is supplied to an electromagnetic part EM of the first switch element 91 via the third switch element 93A. When the electric power is supplied to the electromagnetic part EM of the first switch element 91, a switch part SW of the first switch element 91 is connected, and the first switch element 91 turns on.

When the quick charging of the drive battery 31 is started when the key switch 34 is in the key-off state, the third switch element 93B turns on. When the third switch element 93B has turned on, the electric power output from the auxiliary battery 35 is supplied to the electromagnetic part EM of the first switch element 91 via the third switch element 93B. When the electric power is supplied to the electromagnetic part EM of the first switch element 91, the switch part SW of the first switch element 91 is connected, and the first switch element 91 turns on.

When the first switch element 91 is turned on, a part of the electric power output from the auxiliary battery 35 is passed through the switch part SW of the first switch element 91 to be supplied to the controller 60 as illustrated by arrow R1a in FIG. 4. In addition, when the first switch element 91 is turned on, a part of the electric power output from the auxiliary battery 35 is passed through the switch part SW of the first switch element 91 to be supplied to the first electric device 70 as illustrated by arrow R1b in FIG. 4.

When the key switch 34 is in the key-off state, the second switch element 92 is turned off even when the drive battery 31 is in the charging state. No electric power is supplied to the second electric device 80.

In the present embodiment, the controller 60 includes a plurality of controllers. The controller 60 includes a first controller 61, a second controller 62, and a third controller 63. The first electric device 70 includes a plurality of electric devices. As described above, examples of the first electric device 70 include a sensor, a cooling fan, and a water pump.

As illustrated in FIG. 5, when the key switch 34 is in the key-on state, the first switch element 91 and the second switch element 92 each turn on. As illustrated by arrow Rem in FIG. 5, a part of the electric power output from the auxiliary battery 35 is passed through the key switch 34 to be supplied to the electromagnetic part EM of the first switch element 91 and the electromagnetic part EM of the second switch element 92. When the electric power is supplied to the electromagnetic part EM of the first switch element 91, the switch part SW of the first switch element 91 is connected, and the first switch element 91 turns on. When the electric power is supplied to the electromagnetic part EM of the second switch element 92, a switch part SW of the second switch element 92 is connected, and the second switch element 92 turns on.

When the first switch element 91 is turned on, a part of the electric power output from the auxiliary battery 35 is passed through the switch part SW of the first switch element 91 to be supplied to the controller 60 as illustrated by arrow R1a in FIG. 5. In addition, when the first switch element 91 is turned on, a part of the electric power output from the auxiliary battery 35 is passed through the switch part SW of the first switch element 91 to be supplied to the first electric device 70 as illustrated by arrow R1b in FIG. 5.

When the second switch element 92 is turned on, a part of the electric power output from the auxiliary battery 35 is passed through the switch part SW of the second switch element 92 so as to be supplied to the second electric device 80 as illustrated by arrow R2 in FIG. 5.

The second electric device 80 includes a plurality of electric devices. As described above, examples of the second electric device 80 include a horn and a work light.

<Computer System>

Figure 6:
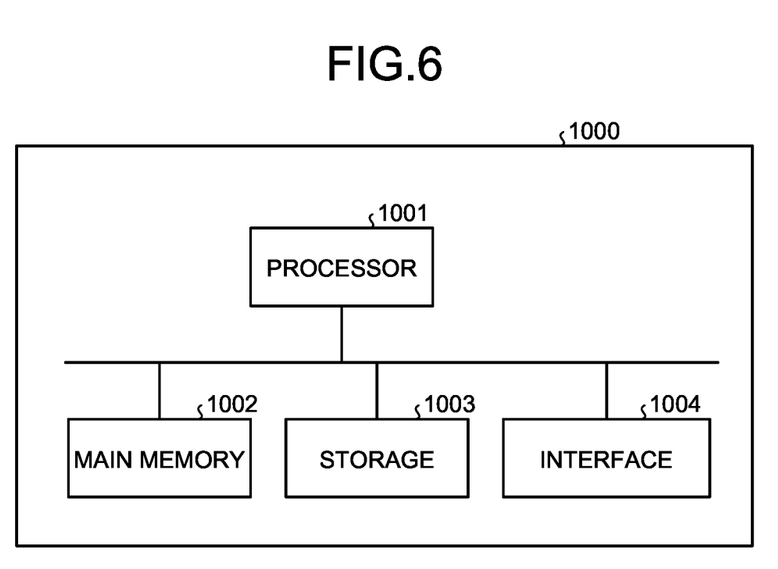
FIG. 6 is a block diagram illustrating an example of a computer system according to the present embodiment.

FIG. 6 is a block diagram illustrating an example of a computer system 1000 according to the present embodiment. The controller 60 described above includes the computer system 1000. The computer system 1000 includes: a processor 1001 such as a central processing unit (CPU); main memory 1002 including non-volatile memory such as read only memory (ROM) and volatile memory such as random access memory (RAM); storage 1003; and an interface 1004 including an input/output circuit. The functions of the controller 60 described above are stored in the storage 1003 as a program. The processor 1001 reads the program from the storage 1003, expands the program to the main memory 1002, and executes the above-described processes according to the program. The program may be delivered to the computer system 1000 via a network.

According to the above-described embodiment, the program can supply the electric power to the first electric device 70 based on the operating state of the key switch 34 and the electric power supply command, and can supply the electric power to the second electric device 80 based on the operating state of the key switch 34.

<Effects>

As described above, according to the present embodiment, when the key switch 34 is in the key-on state, the first electric device 70 and the second electric device 80 are each energized. When the key switch 34 is in the key-off state, the first electric device 70 and the second electric device 80 are each de-energized. The charging work of the drive battery 31 can be performed in the key-on state and the key-off state of the key switch 34 individually. Since an operator does not need to be with the excavator 1 when the key switch 34 is in the key-off state, the charging work on the drive battery 31 can be performed at an unmanned work site.

When the charging work of the drive battery 31 is performed at an unmanned work site, the operation switch of the second electric device 80 or the second electric device 80 arranged on or around the operator's seat 6 might be operated by an outsider. For example, a mischievous outsider might sound the horn of the second electric device 80 or turn on the work light. In a case where the excavator 1 is a canopy model in particular, an outsider can easily touch and operate the second electric device 80.

In the present embodiment, electric power is supplied to the first electric device 70 including the controller 60 necessary for the charging work of the drive battery 31 when the key switch 34 is in the key-off state and the drive battery 31 is in the charging state. Even when the drive battery 31 is in the charging state, the electric power would not be supplied to the second electric device 80 when the key switch 34 is in the key-off state. Therefore, by removing the key from the key cylinder while the drive battery 31 is in the charging state, an outsider cannot operate the second electric device 80.

In this manner, electric power is supplied to the first electric device 70 including the controller 60 necessary for the charging work of the drive battery 31, while no electric power is supplied to the second electric device 80 unnecessary for the charging work of the drive battery 31. Accordingly, the charging work of the drive battery 31 can be performed while driving the first electric device 70 in a state where the operation of the second electric device 80 by an outsider is suppressed. For example, in the charging work of the drive battery 31, the display unit of the display device 9 may be darkened as compared with it during the operation.

That the key switch 34 is in the key-on state means that the operator is in the vicinity of the excavator 1. That is, the key-on state of the key switch 34 means that the excavator 1 is under the control of the operator. The operator can put the key switch 34 in the key-on state and drive the first electric device 70 and the second electric device 80 individually.

Other Embodiments

In the above-described embodiment, the electric power output from the auxiliary battery 35 is to be supplied to the first electric device 70 and the second electric device 80. Alternatively, the electric power output from the drive battery 31 may be supplied to the first electric device 70 and the second electric device 80. For example, the controller 60 may first adjust the voltage output from the drive battery 31 by using the DC/DC converter 42 and may thereafter supply the voltage to the first electric device 70 and the second electric device 80. Furthermore, the first electric device 70 may be supplied with the voltage from the DC/DC converter 42 while the second electric device 80 may be supplied with the voltage from the auxiliary battery 35. Alternatively, some of the first electric devices 70 may be supplied with the voltage from the DC/DC converter 42, and the rest may be supplied with the voltage from the auxiliary battery 35. A power suitable for each of individual electric devices may be supplied.

In the above-described embodiment, the electric power supply command is output from the power distribution unit 40. Alternatively, however, the controller 60 may determine whether it is in the charging state or the operating state, and the electric power supply command for activating the third switch element 93 may be output depending on the determination. In that case, the controller 60 does not correspond to the first electric device or the second electric device.

In the above-described embodiment, the first electric device 70 is defined as an electric device that is driven during charging of the drive battery 31, such as a sensor, a cooling fan, and a water pump. The first electric device 70 does not have to be the electric device to be driven during the charging of the drive battery 31. The first electric device 70 may be set to any electric device.

In the above-described embodiment, the second electric device 80 is defined as an electric device that is disposed in the operator's seat 6, an electric device arranged around the operator's seat 6, or an electric device that is driven by an operation switch operable in the operator's seat 6, such as a horn and a work light. The second electric device 80 does not have to be an electric device that is disposed in the operator's seat 6, an electric device arranged around the operator's seat 6, or an electric device that is driven by an operation switch operable in the operator's seat 6. The second electric device 80 may be a power socket, like an accessory socket, that provides an auxiliary battery voltage or the like with no operation switch. The second electric device 80 may be set to any electric device.

In the above-described embodiment, the excavator 1 does not have to be a canopy model. The excavator 1 may be a cabin model in which the space around the operator's seat 6 is closed.

In the above embodiment, the work vehicle 1 does not have to be the excavator 1. The work vehicle 1 may be, for example, a wheel loader, a bulldozer, or a forklift.

In the above-described embodiment, the work vehicle 1 may be a work vehicle in which the working equipment 5, the traveling motor 23, and the swivel motor 25 are driven by an electric actuator instead of the hydraulic system 20. In this case, electric power is supplied from the drive battery 31. The work vehicle is an electric work vehicle.

Although the above-described embodiment of charging is a case where two types of charging methods, standard charging and quick charging, are possible, the present invention is not limited to this. For example, one charging method or only one charging inlet may be used. Furthermore, although the electric power source is also described above as single-phase 200 V for standard charging and three-phase 200 V for quick charging, the present invention is not limited to this example.

Although the above-described embodiment assumes that the key switch 34, which is a start-up switch, can be turned on by turning the key inserted into the key cylinder, the present invention is not limited to this. For example, the operator may possess a device having a built-in electronic chip and may make a determination of turning on by an operator's predetermined operation when the device is within a certain range from the vehicle.

Although the above-described embodiment is a case where the first switch element 91 switches between supply/stop supply regarding the electric power to the first electric device by the third switch element 93, the present invention is not limited to this. The supply/stop supply regarding the electric power to the first electric device may be implemented by using on-off state switching signals from the controller 60 instead of using the third switch element 93.

REFERENCE SIGNS LIST

1 EXCAVATOR (WORK VEHICLE)
2 CARRIAGE
3 SWIVEL MEMBER
4 BLADE
5 WORKING EQUIPMENT
5A BOOM
5B ARM
5C BUCKET
6 OPERATOR'S SEAT
7 WORKING EQUIPMENT LEVER
8 TRAVELING LEVER
9 DISPLAY DEVICE
10 SUPPORT ARM
11 SUPPORT COLUMN
12 CANOPY
20 HYDRAULIC SYSTEM
21 MAIN PUMP
22 MAIN VALVE
23 TRAVELING MOTOR
24 TRAVELING MOTOR
25 SWIVEL MOTOR
26 WORKING EQUIPMENT CYLINDER
26A BOOM CYLINDER
26B ARM CYLINDER
26C BUCKET CYLINDER
30 ELECTRIC SYSTEM
31 DRIVE BATTERY
32 ELECTRIC MOTOR
33 INVERTER
34 KEY SWITCH (START-UP SWITCH)
35 AUXILIARY BATTERY
40 POWER DISTRIBUTION UNIT
41 STANDARD CHARGER
42 DC/DC CONVERTER
60 CONTROLLER
61 FIRST CONTROLLER
62 SECOND CONTROLLER
63 THIRD CONTROLLER
70 FIRST ELECTRIC DEVICE
80 SECOND ELECTRIC DEVICE
91 FIRST SWITCH ELEMENT
92 SECOND SWITCH ELEMENT
93 THIRD SWITCH ELEMENT
93A THIRD SWITCH ELEMENT
93B THIRD SWITCH ELEMENT
100 COMMERCIAL POWER SOURCE
101 SWITCHBOARD
102 STANDARD CHARGING CABLE
110 COMMERCIAL POWER SOURCE (THREE-PHASE 200 V)
111 QUICK CHARGER
112 SWITCHBOARD
113 QUICK CHARGING CABLE

The invention claimed is:

1. A work vehicle that is a work machine, the work vehicle comprising:
 a start-up switch;
 a drive battery that outputs electric power required to drive the work machine;
 an electric motor that is driven by the electric power supplied from the drive battery;
 a first electric device that is an electric device different from the electric motor;
 a second electric device that is an electric device different from the electric motor; and
 a power distribution unit that outputs an electric power supply command when the drive battery is in a charging state,
 wherein electric power is supplied to the first electric device based on an operating state of the start-up switch and an electric power supply command, and
 electric power is supplied to the second electric device based on the operating state of the start-up switch.

2. The work vehicle according to claim 1,
 wherein the operating state includes a key-off state and a key-on state,
 electric power is supplied to each of the first electric device and the second electric device in the key-on state,
 electric power is not supplied to each of the first electric device and the second electric device in both the key-off state and a non-output state of the electric power supply command, and
 in both the key-off state and an output state of the electric power supply command, electric power is supplied to the first electric device and electric power is not supplied to the second electric device.

3. The work vehicle according to claim 1, further comprising:
 a first switch element that operates based on one or both of the operating state and the electric power supply command; and
 a second switch element that operates based on the operating state,
 wherein electric power is supplied to the first electric device when the first switch element is turned on, and
 electric power is supplied to the second electric device when the second switch element is turned on.

4. The work vehicle according to claim 3, further comprising
 a third switch element that turns on when the drive battery is in the charging state,
 wherein the first switch element turns on when the third switch element is turned on.

5. The work vehicle according to claim 3,
 wherein the first electric device is driven in a state where the drive battery is in the charging state.

6. The work vehicle according to claim 1, further comprising
 an operator's seat,
 wherein the second electric device is disposed in the operator's seat, disposed around the operator's seat, or is operable in the operator's seat.

* * * * *